(12) United States Patent
Telian

(10) Patent No.: US 9,739,503 B2
(45) Date of Patent: Aug. 22, 2017

(54) HEAT EXCHANGER TUBE AND HEATING BOILER HAVING SUCH A HEAT EXCHANGER TUBE

(71) Applicant: Hoval Aktiengesellschaft, Vaduz (LI)

(72) Inventor: Markus Walter Telian, Hörbranz (AT)

(73) Assignee: Hoval Aktiengesellschaft, Vaduz (LI)

( * ) Notice: Subject to any disclaimer, the term of this patent is extended or adjusted under 35 U.S.C. 154(b) by 65 days.

(21) Appl. No.: 14/836,167

(22) Filed: Aug. 26, 2015

(65) Prior Publication Data

US 2017/0023276 A1 Jan. 26, 2017

(30) Foreign Application Priority Data

Jul. 23, 2015 (EP) .................................... 15178123

(51) Int. Cl.
*F28F 1/06* (2006.01)
*F24H 1/20* (2006.01)
(Continued)

(52) U.S. Cl.
CPC ............... *F24H 1/205* (2013.01); *F24H 1/28* (2013.01); *F24H 8/00* (2013.01); *F24H 9/0026* (2013.01);
(Continued)

(58) Field of Classification Search
CPC .................................... F28F 1/06; F22B 37/18
USPC ........ 122/511, DIG. 13, 406.3, 367.1, 367.2, 122/364, 44.2; 165/177, 147, 179, 174, 165/181, 142
See application file for complete search history.

(56) References Cited

U.S. PATENT DOCUMENTS

| | | | |
|---|---|---|---|
| 1,186,573 A * | 6/1916 | Haeusser ................ | F28F 13/12 122/44.2 |
| 1,549,489 A * | 8/1925 | Jones ........................ | F28F 1/06 122/511 |

(Continued)

FOREIGN PATENT DOCUMENTS

| | | |
|---|---|---|
| CN | 1120347 | 9/2003 |
| CN | 203011221 | 6/2013 |

(Continued)

OTHER PUBLICATIONS

European Search Report filed in EP 15178123 dated Feb. 19, 2016.
Japanese Office action filed in 2016-125408 mailed Apr. 25, 2017.

*Primary Examiner* — Gregory A Wilson
(74) *Attorney, Agent, or Firm* — Rankin, Hill & Clark LLP

(57) ABSTRACT

A heat exchanger tube of a heating boiler, comprising an outer tube, which may be flown through by exhaust gases from the boiler firing and which may be surrounded by boiler water on the outside, and a profiled insert inserted into the outer tube, which comprises ribs running in longitudinal direction of the outer tube to enlarge the inner surface of the outer tube and which is in thermally conductive contact with the outer tube, are to achieve that an even greater heat transfer capacity from the combustion gases to the boiler water in the heating boiler is enabled. A first longitudinal section of the outer tube is formed in a cylindrical, smooth-walled manner and a second longitudinal section of the outer tube has at least one cross-sectional narrowing element narrowing the flow cross section. The profiled insert extends exclusively over the first longitudinal section of the outer tube.

11 Claims, 3 Drawing Sheets

(51) Int. Cl.
  *F24H 1/28* (2006.01)
  *F24H 8/00* (2006.01)
  *F24H 9/00* (2006.01)
  *F28F 1/40* (2006.01)
  *F28F 1/00* (2006.01)

(52) U.S. Cl.
  CPC ........... *F24H 9/0031* (2013.01); *F28F 1/006* (2013.01); *F28F 1/40* (2013.01); *Y02B 30/102* (2013.01)

(56) References Cited

U.S. PATENT DOCUMENTS

| | | | | |
|---|---|---|---|---|
| 3,232,280 | A * | 2/1966 | Loebel | F22B 7/12 122/149 |
| 3,724,523 | A * | 4/1973 | Mattern | B01D 1/22 159/13.2 |
| 4,817,672 | A * | 4/1989 | Broodman | C10G 9/20 122/DIG. 13 |
| 4,842,055 | A * | 6/1989 | Ohtsu | B01D 1/06 122/406.3 |
| 5,791,299 | A * | 8/1998 | Matsuo | F22B 21/065 110/254 |
| 6,029,614 | A * | 2/2000 | Kayahara | F22B 21/065 122/367.1 |
| 6,070,657 | A * | 6/2000 | Kunkel | F24H 9/0026 138/157 |
| 6,116,196 | A * | 9/2000 | Watanabe | F22B 21/065 122/235.11 |
| 7,255,155 | B2 * | 8/2007 | O'Donnell | F24H 9/0026 165/109.1 |
| 9,149,847 | B2 * | 10/2015 | Holden | B21C 37/15 |
| 2008/0029243 | A1 * | 2/2008 | O'Donnell | F24H 3/087 165/48.1 |
| 2013/0205784 | A1 * | 8/2013 | Brodesser | F22B 21/34 60/670 |
| 2014/0131021 | A1 | 5/2014 | Choi | |
| 2016/0245598 | A1 * | 8/2016 | Bosscher | F28F 13/08 |

FOREIGN PATENT DOCUMENTS

| | | |
|---|---|---|
| DE | 854224 | 10/1952 |
| EP | 2781873 | 9/2014 |
| JP | 59-100397 | 6/1984 |
| JP | 61-170803 | 10/1986 |
| JP | 7-71840 | 3/1995 |
| JP | 9-507708 | 8/1997 |
| KR | 101427045 | 8/2014 |
| KR | 101521353 | 5/2015 |
| WO | 2015/050441 | 4/2015 |

\* cited by examiner

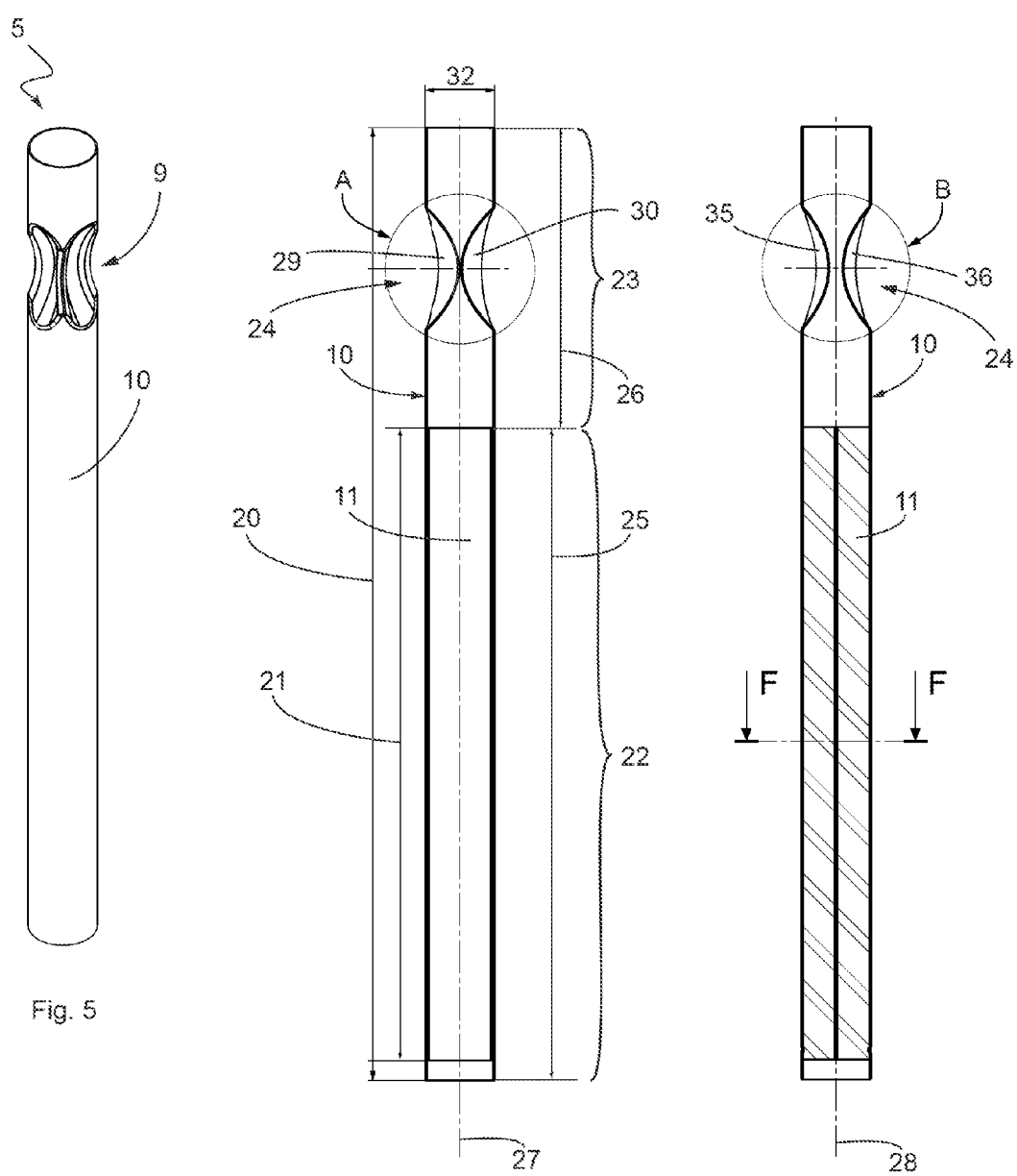

HEAT EXCHANGER TUBE AND HEATING BOILER HAVING SUCH A HEAT EXCHANGER TUBE

The present invention relates to a heat exchanger tube of a heating boiler, in particular, a condensing boiler, having an outer tube, which may be flown through by exhaust gases from the boiler firing and which may be surrounded by boiler water on the outside, and a profiled insert inserted into the outer tube, which has ribs running in the longitudinal direction of the profiled insert to enlarge the inner surface of the outer tube and which is in heat conductive contact with the outer tube.

Similarly, the present invention relates to a heating boiler, in particular, a condensing boiler for heating boiler water of a heating circuit, having a housing which confines a boiler water space and which has a combustion chamber placed upstream of the boiler water space.

Such a heating boiler of the art described at the outset, as it is offered for sale by the applicant, may be operated as a condensing boiler by firing with gas or liquid (fuel oil, kerosene or the like). In such a condensing boiler, the combustion gases are cooled until the exhaust gas moisture condenses in order to utilize the heat of condensation. A prerequisite is that the heating boiler or condensing boiler is operated by a boiler water temperature which is lower at the end of the combustion gas path across the heating boiler than the dew point temperature of the combustion gases. One endeavors to cool the combustion gases over as short as possible a path of the combustion gases through the water cooled heat exchanger tubes of the heating boiler from the high inlet temperature to a temperature that is between the dew point temperature and the lowest boiler water temperature. For this purpose, heat exchanger tubes are known, and a heat exchanger tube of the art described at the outset is, for example, known from the publication EP 0 752 088 A1.

The object of the present invention is to provide a heat exchanger tube and a heating boiler in a constructively simple and cost-effective manner which enable an even greater heat transfer capacity from the combustion gases to the boiler water.

In a heat exchanger tube of the art referenced at the outset, the object is achieved according to the present invention in that a first longitudinal section of the outer tube is designed in a cylindrical, smooth-walled manner and a second longitudinal section of the outer tube has at least one cross-sectional narrowing element narrowing the flow cross section, and the profiled insert extends exclusively over the first longitudinal section of the outer tube. In other words, the profiled insert is situated exclusively within the first longitudinal section.

Likewise, in a heating boiler of the art referenced at the outset, the object is achieved according to the present invention in that at least one heat exchanger tube according to claims 1 through 13, which branches off from the combustion chamber and extends running through the boiler water space, is situated inside the housing. In this instance, at least one heat exchanger tube for very small capacities of approximately 10 kW is conceivable, whereas in most application cases a plurality of heat exchanger tubes are provided. The at least one heat exchanger tube may, for example, run vertically or also horizontally through the boiler water space, and also any other angle between 90° (vertical) and 0° (horizontal) is conceivable.

Advantageous and appropriate embodiments and further refinements of the present invention result from the dependent claims.

The present invention provides a heat exchanger tube and a heating boiler having a plurality of such heat exchanger tubes which each distinguish themselves by a functionally appropriate construction and have a simple and cost-effective composition. The heat exchanger tubes known from the related art have the problem that the hot combustion gases flow through the heat exchanger tube from the inlet to its outlet and cool during this process. The accompanying and significant reduction of the volume of the combustion gas resulted in that the flow velocity and the turbulence were significantly reduced when reaching the outlet of the heat exchanger tube, which disadvantageously affects the efficiency of the heat transfer. In contrast, the present invention increases, by the at least one cross-sectional narrowing element narrowing the flow cross section of the outer tube, the pressure loss upstream of the cross-sectional narrowing element, thus, between combustion chamber and cross-sectional narrowing element, as a result of which more energy may, according to the present invention, be transferred in the combustion chamber and in the second longitudinal section of the heat exchanger tube ahead of the cross-sectional narrowing element. In the cross section ahead of the cross-sectional narrowing element, the flow velocity of the exhaust gas is severely increased because of the narrowing of the flow cross section, as a result of which the heat transfer and, therefore, the energy utilization of the exhaust gas are additionally increased. In the longitudinal section downstream of the narrowing of the flow cross section, thus, downstream of the cross-sectional narrowing element, the exhaust gas again expands and is guided into the longitudinal section of the outer tube by the profiled insert. By means of the very large surface based on the ribs of the profiled insert running in the longitudinal direction of the heat exchanger tube, the exhaust gas is cooled below the dew point in the first longitudinal section of the outer tube, which advantageously affects the condensing boiler technology and, as a result, the efficiency of the heating boiler. The advantages of the present invention resulting from the heat exchanger tube and the therewith equipped heating boiler may be described as follows. Compared to heat exchanger tubes not having a narrowing, the increased pressure losses upstream of the narrowing results in an improved heat transfer in the combustion chamber and at the inlet of the heat exchanger tube. Furthermore, the increase of the flow velocity in the area of the narrowing and, in particular, downstream of the narrowing results in an improved heat transfer because the laminar flow ahead of the narrowing turns, by means of the cross sectional narrowing element, into a turbulent flow downstream. Finally, the enlargement of the heat transfer area by means of the ribs of the profiled insert results, in the first longitudinal section of the heat exchanger tube, in reduced flow velocities downstream of the narrowing and results in low exhaust gas temperatures, additionally contributing to an improved heat transfer onto the boiler water.

In an embodiment of the heat exchanger tube according to the present invention, the present invention provides that the at least one cross-sectional narrowing element is designed as at least one recess in the wall of the second longitudinal section of the outer tube. In this manner, no additional component has to be produced or installed for the advantageous mode of action to result.

In one embodiment of the heat exchanger tube according to the present invention, it has been proven to be particularly effective when the at least one cross-sectional narrowing element includes at least two first recesses formed in the wall of the second longitudinal section of the outer tube, and the two first recesses are situated diametrically opposite each other and are designed as a symmetrical mirror image in reference to a first tube area.

In order to increase the flow velocity downstream of the recesses, according to a further embodiment it is provided that between the at least two first recesses at least one first flow gap is formed which measures between 2% and 3% of the diameter of the outer tube.

In order to further increase the efficiency of the cross-sectional narrowing element provided by the present invention, one embodiment of the heat exchanger tube provides that the cross-sectional narrowing element includes, in addition to the at least two first recesses, at least two second recesses which are formed by the wall of the second longitudinal section of the outer tube, and the two second recesses are positioned diametrically opposite each other and are designed as a symmetrical mirror image in reference to a second tube area running perpendicular to the first tube area.

Furthermore, the present invention provides in an embodiment of the second recesses of the cross-sectional narrowing element that between the at least two second recesses at least one second flow gap is formed which measures between 18% and 22% of the diameter of the outer tube.

In regard to increasing the flow velocity and the turbulence downstream of the cross-sectional narrowing element, the present invention provides a further embodiment so that the first and second recesses are formed at the same axial position of the second longitudinal section of the outer tube, and the flow cross section of the second longitudinal section of the outer tube formed by the first and second recess has an H-shaped cross section. Of course, it is also conceivable that the first and the second recesses are formed axially offset at different axial positions of the second longitudinal section of the outer tube.

According to one embodiment of the present invention, it has been proven to be optimal for the heat exchanger tube according to the present invention that the axial length of the first longitudinal section is at least twice the axial length of the second longitudinal section. In an alternative embodiment, the axial length of the second longitudinal section may be longer than the axial length of the first longitudinal section.

In an advantageous embodiment, the present invention provides that the profiled insert includes a tubular body formed by at least two shell elements, which have respectively one cross section in the shape of a sector of a circle. This embodiment enables to easily produce the heat exchanger tubes using a simple production method.

It is of particular advantage when, in the embodiment of the heat exchanger tube according to the present invention, the tubular body includes two shell elements, which at their contacting longitudinal edges are formed having groove-shaped recesses and rib-like projections and, for this reason, engage in one another in a sealing manner, and the two shell elements are constructed on their interior side with the ribs, which project into the clear cross section of the tubular body and extend in the longitudinal direction of the outer tube, in such a manner that each shell element with its ribs constitutes a profile open on one side. This embodiment of the shell elements as two half-shells with ribs constituting a profile open on one side may be easily and cost-effectively produced, for example, by extrusion.

One embodiment of the heat exchanger tube according to the present invention provides that the two shell elements are designed having respectively a sealing groove at one longitudinal edge and having a sealing rib adapted to the shape of the sealing groove at the other longitudinal edge. This embodiment in a manner of a labyrinth seal prevents in the first longitudinal section of the outer tube the formation of a gap through which the exhaust gas or condensate could penetrate between the profiled insert and the outer tube and result in corrosion.

One simple and cost-effective possibility for producing the heat exchanger tube according to the present invention is an embodiment of the present invention, in which at least one cross-sectional narrowing element is constructed as a tubular insert designed as a type of a duct which is inserted into the outer tube in its second longitudinal section. In this manner, the outer tube does not have to be reworked when allowing for indentations or recesses for the cross-sectional narrowing. It rather suffices when a separate cross-sectional narrowing element is produced having a diameter adapted to the inner diameter of the outer tube which then may be inserted together with the profiled insert into the outer tube when installing or delivering the heat exchanger tube.

In a further embodiment, the present invention provides that the outer tube is constructed out of metal alloy, preferably steel, and the profiled insert is made out of aluminum. Owing to the material choice, the outer tube is acid and alkali resistant to the exhaust gas condensate and otherwise still may be welded at its ends into tube bases or tube plates which, on the one hand, separate the boiler water space surrounding the heat exchanger tubes from the combustion chamber and, on the other hand, from the exhaust gas manifold of the heating boiler.

Finally, for increasing the efficiency of the heat transfer, the present invention provides that the second longitudinal section of the outer tube having at least one cross-sectional narrowing element is situated between the combustion chamber and the first longitudinal section of the outer tube. In this manner, the cross-sectional narrowing element of the heat exchanger tube influences the flow of the combustion gas in the area of its inlet and increases the flow velocity and the turbulence in the heat exchanger tube.

It is understood that the previously mentioned and subsequently still-to-be-described features may not only be used in the respectively specified combination but also in other combinations or may be used standing on their own without leaving the scope of the present invention. The scope of the present invention is only defined by the claims.

Further details, features and advantages of the subject of the present invention result from the subsequent description in conjunction with the drawing in which a preferred exemplary embodiment of the present invention is illustrated in an exemplary manner. In the drawing:

FIG. 4 shows a sectional view of the heat exchanger tube according to the present invention;

FIG. 5 shows in a perspective illustration the heat exchanger tube according to the present invention;

FIG. 6 shows a lateral cross-sectional view onto the heat exchanger tube according to the present invention along a tube plane;

FIG. 7 shows a further lateral-cross sectional view onto the heat exchanger tube according to the present invention along a different tube plane;

Figures 1, 2:
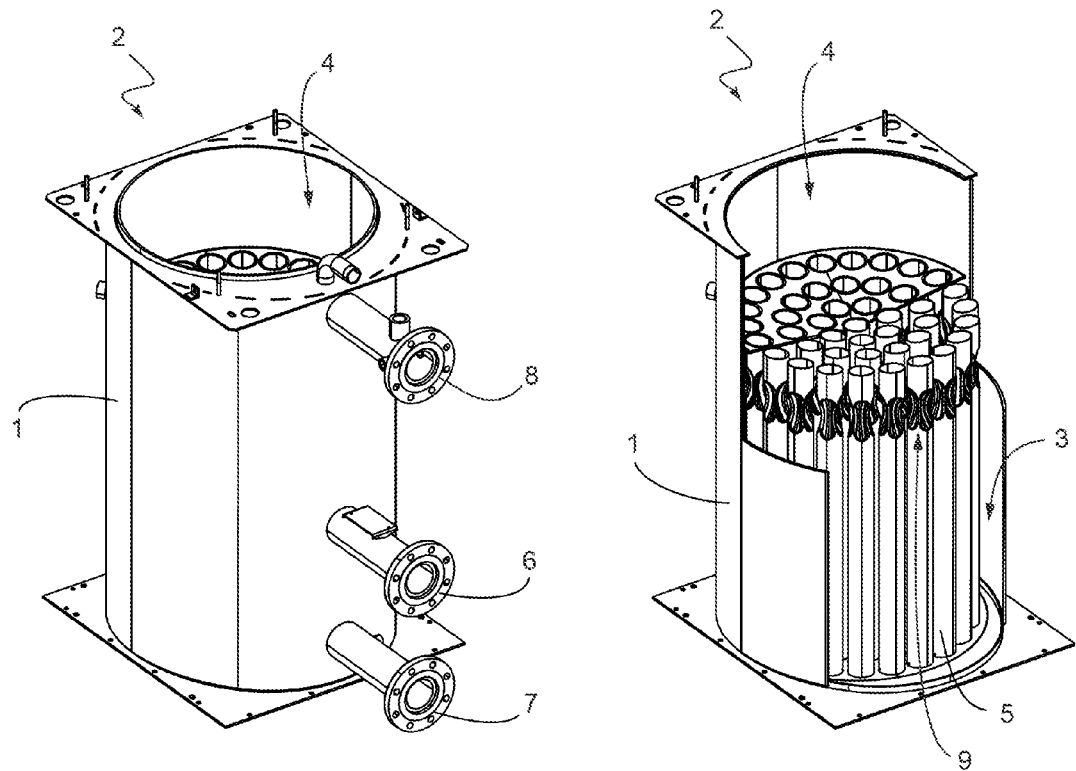
FIG. 1 shows a heating boiler according to the present invention in a perspective view.
FIG. 2 shows a further perspective illustration of the heating boiler having a partially cut housing.

FIG. 1 shows housing 1 of a heating boiler 2 in a perspective view, the housing being partially hidden in FIG. 2 so to enable a better insight into the interior of housing 1. Heating boiler 2 serves to heat the boiler water of a heating circuit not illustrated in more detail and may be embodied as a condensing boiler. Housing 1 encloses a boiler water space 3 and further includes a pot-like or conically designed combustion chamber 4, which is situated above boiler water space 3 and which is assigned to a non-illustrated burner. A heat exchanger having a plurality of heat exchanger tubes 5, which penetrate boiler water space 3 and run into an exhaust gas collecting chamber not further illustrated, is situated at the bottom of combustion chamber 4. Consequently, heat exchanger tubes 5 depart from the bottom of combustion chamber 4 and extend in the shown exemplary embodiment substantially in a vertical direction through boiler water space 3, and, alternatively, an arbitrary angle between 0° for a horizontal run and 90° for a vertical run of the exchanger tubes 5 in the boiler water space is also conceivable. In this instance, the outer surfaces of heat exchanger tubes 5 surrounded by the boiler water give off heat to the boiler water in boiler water space 3, and in heat exchanger tubes 5 exists such a temperature difference that the temperature in the upper area substantially exceeds the temperature in the bottom area. Return connectors 6 or 7 run into the boiler water space via which the cooled return water of different heating circuits is fed again to boiler water space 3. The heating circuit connected to return connector 6 serves, for example, to heat use water, thus, having a comparably high return temperature, while bottom return connector 7 is connected to a heating circuit, for example, for in-floor heating, thus, having a relatively low return temperature. The heated boiler water for the heating circuits is retrieved via upper supply connector 8.

FIG. 2 shows heat exchanger tubes 5 which in their upper area are, according to the present invention, designed having recesses or respectively having a surrounding indentation 9. A single heat exchanger tube 5 according to the present invention is shown in an itemized perspective illustration in FIG. 3. As can be seen, heat exchanger tube 5 has an outer tube 10 which during operation of heating boiler 2 is flown-through by exhaust gases from the boiler firing and which is surrounded on the outside by the boiler water, and a profiled insert 11 in the assembled state is slid into outer tube 10. In the illustrated exemplary embodiment, outer tube 10 is constructed out of metal alloy, preferably steel. In order to enlarge the interior surface of outer tube 10, profiled insert 11 has ribs 14 running in longitudinal direction 12 of the outer tube and is in thermally conductive contact with outer tube 10, and to improve the heat transfer, profiled insert 11 is constructed out of aluminum.

In the illustrated exemplary embodiment, profiled insert 11 includes a tubular body which is formed by two shell elements 15, 16. The two shell elements 15, 16 each have a semicircular cross section. Of course, a one-piece profiled insert 11 would be also conceivable, which, however, would not be producible in a cost-effective manner. For this reason, an at least two-piece profiled insert 11 is rather to be pursued, which shell elements are shaped as a sector of a circle to form a closed profiled insert 11. According to the exemplary embodiment, the tubular body thus includes two shell elements 15, 16 which at their contacting longitudinal edges 17 are constructed with groove-shaped recesses 18 and rib-like projections 19 and, for this reason, engage into one another in a sealing manner, as it is shown in an enlarged detailed view in FIG. 4. Two shell elements 15, 16 at their interior sides are constructed with ribs 14, which project into the clear cross section of the tubular body and extend in longitudinal direction 12 of outer tube 10, and each shell element 15, 16 with its ribs 14 constitutes a profile open on one end. In particular, two shell elements 15, 16 are designed respectively having recess 18 functioning as a sealing groove at one longitudinal edge 12 and having a sealing rib aligned in the shape of a sealing groove, which is projection 19, at the other longitudinal edge 12. Profiled insert 11 assembled from two shell elements 15, 16 adjoins on its entire circumferential area directly at outer tube 10 and is constructed by an outer diameter which is slightly smaller than the interior diameter of outer tube 10 so that profiled insert 11 is able to be slid without difficulty into outer tube 10.

Figure 3:
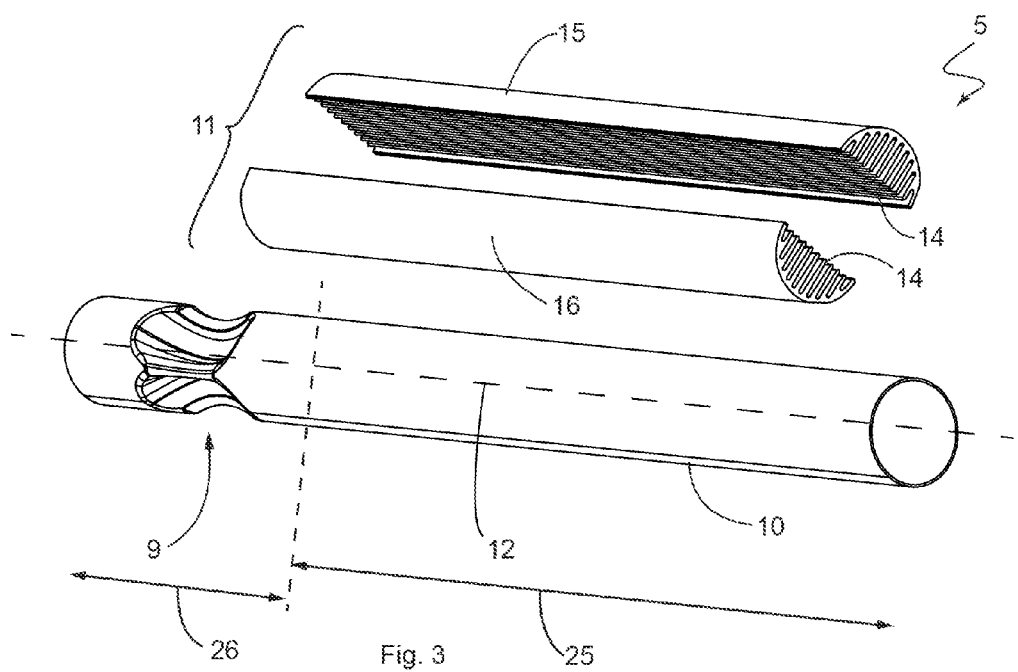
FIG. 3 shows an itemized illustration of the heat exchanger tube according to the present invention of the heating boiler in a perspective view.
Figure 8:
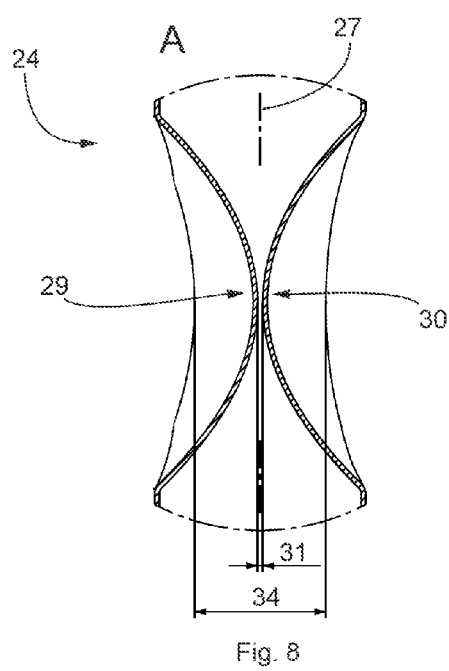
FIG. 8 shows an enlarged illustration of a longitudinal section of the heat exchanger tube from FIG. 6.

As could already be seen from FIG. 3, outer tube 10 and profiled insert 11 have different axial lengths, which is illustrated in FIGS. 6 and 7 showing different lateral views of heat exchanger tube 5 according to the present invention, whereas a single heat exchanger tube 5 is shown in FIG. 5, in which profiled insert 11 is slid into outer tube 10 and cannot be seen from the outside.

It can be concluded from FIG. 6 that axial length 20 of outer tube 10 ideally equates to 1.5 times of axial length 21 of profiled insert 11, and it is also conceivable that axial length 20 of the outer tube equates to 1.3 times or 1.7 times of axial length 21 of profiled insert 11. Different axial lengths 20, 21 of outer tube 10 and profiled insert 11 result in that outer tube 10 is divided into two longitudinal sections. In this instance, a first longitudinal section 22 of outer tube 10 is constructed in a cylindrical, smooth-walled manner. A second longitudinal section 23 of outer tube 10 has at least one cross-sectional narrowing element 24 narrowing the flow cross section. In this instance, profiled insert 11 extends exclusively over first longitudinal section 22 of outer tube 10. This results in that, in the illustrated exemplary embodiment, axial length 25 of first longitudinal section 22 equates to at least two times axial length 26 of second longitudinal section 23. In very special cases of application, it is also possible to have an alternative length ratio where axial length 26 of second longitudinal section 23 is longer than axial length 25 of first longitudinal section 22.

In reference to FIG. 6 it is shown that profiled insert 11 is not flush with outer tube 10, but a small piece is inserted into outer tube 10 so that profiled insert 11 is completely received into outer tube 10 and, in particular, is received by first longitudinal section 22. Furthermore, it can be concluded from FIG. 6 in conjunction with FIG. 2 that second longitudinal sections 23 of respective outer tubes 10 having cross-sectional narrowing element 24 are situated between combustion chamber 4 and the respective first longitudinal sections 22 of respective outer tubes 10. Accordingly, a respective cross-sectional narrowing element 24 is situated directly downstream of combustion chamber 4.

In this instance, cross-sectional narrowing element 24 could be built as a tubular insert designed as a type of a duct which is slid into second longitudinal section 23 of outer tube 10. For this reason, outer tube 10 would be continuously formed in a smooth-walled manner in first and second longitudinal section 22, 23. In contrast, in the illustrated exemplary embodiment, second longitudinal section 23 of outer tube 10 has indentations or recesses 9.

Viewing FIGS. 6 through 13 combined, the shape of cross-sectional narrowing element 24 is subsequently described in greater detail. For this purpose, the cross section of outer tube 10 is divided according to FIGS. 6, 7 and 10 on the basis of a first tube plane 27 and a second tube plane 28 running perpendicular to first tube plane 27. In this instance, FIG. 6 shows a sectional view along first tube plane 27, while FIG. 7 shows a sectional view along second tube plane 28. As can be seen from FIGS. 6 through 13, cross-sectional narrowing element 24 includes two first recesses or indentations 29, 30 which are formed in the wall of second longitudinal section 23 of outer tube 10. In particular, first recesses 29, 30 are pressed into the wall of second longitudinal section 23 so that first recesses 29, 30 represent concavely designed or inwardly curved indentations. Two first recesses 29, 30 are situated diametrically opposite each other and designed as a mirror image in reference to first tube plane 27. Between two first recesses 29, 30, a first flow gap 31 (see FIG. 8) is formed which measures between 2% and 3% of diameter 32 (see FIG. 6) of outer tube 10, as the enlargement of cutout A from FIG. 6 shows in FIG. 8. In order to form first recesses 29, 30, the wall of outer tube 10 is punctually pressed-in from both sides of the tube so that inwardly curved indentations result which, at the point of their smallest distance, form first flow gap 31. In this instance, the wall is deformed for recesses 29, 30 over an axial length 33 (see FIG. 9) equating to 0.4 times axial length 26 of second longitudinal section 23, and an axial length 33 which equates to 0.3 times to 0.5 times axial length 26 is also possible. For this purpose, the wall on this axial length 33 of the deformation is pressed-in overall for first recesses 29, 30 in such a manner that the wall across axial length 33 has a maximum diameter 34 for first recesses 29, 30 which equates to 0.6 times of diameter 32 of smooth-walled outer tube 10, and a maximum diameter 34 is also possible which equates to 0.5 times to 0.7 times of diameter 32 of smooth-walled outer tube 10.

Figure 9:
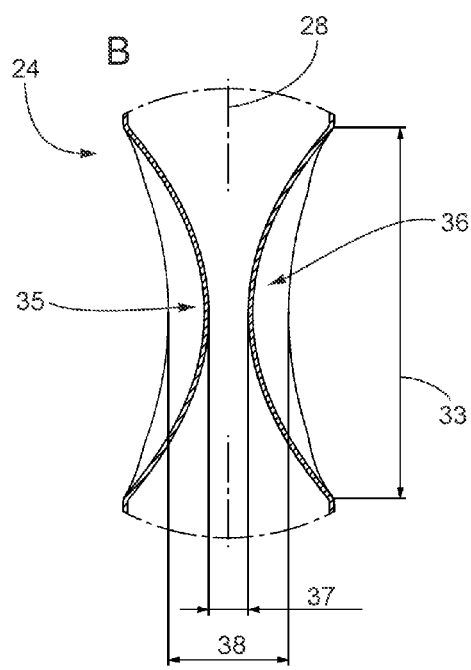
FIG. 9 shows another enlarged illustration of a longitudinal section of the heat exchanger tube from FIG. 7.
Figure 11:
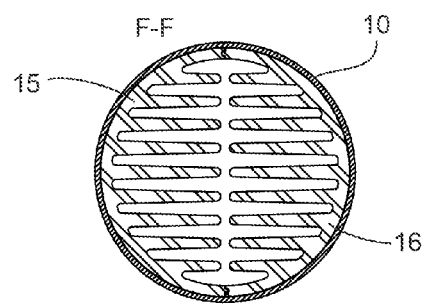
FIG. 11 shows a further cross-sectional view of the heat exchanger tube according to the present invention for another axial position.

FIGS. 7 and 9 show further illustrations for second indentations 35, 36, and axial length 33 of the deformation for first indentations 29, 30 and for second indentations 35, 36 is ideally identical and, for this reason, is only shown in FIG. 9. The axial length of the deformation may, however, also be different for first and second indentations. In FIG. 7, axial section F-F illustrated in FIG. 11 is furthermore drawn next to profiled insert 11 and outer tube 10 and two shell elements 15, 16 are shown forming profiled insert 11. Two second indentations 35, 36 together with two first indentations 29, 30 form cross-sectional narrowing element 24, and first indentations 29, 30 are designed differently from two second indentations 35, 36. Two second recesses 35, 36 are also situated diametrically opposite each other and designed as a mirror image in reference to second tube plane 28. Second recesses 35, 36 are pressed also into the wall of second longitudinal section 23 so that they illustrate concavely designed or inwardly curved indentations. Between two second recesses 35, 36, a second flow gap 37 is formed which is greater than first flow gap 31 and which measures between 18% and 22% of diameter 32 (see FIG. 6) of outer tube 10, as the enlargement of cutout B from FIG. 7 shows in FIG. 9. Here also, to form second recesses 35, 36, the wall of outer tube 10 is punctually pressed-in from both sides of the tube so that inwardly curved indentations result which form flow gap 37 at the point of their smallest distance. The wall is deformed for indentation 35, 36 over axial length 33 (see FIG. 9), which also equates to 0.4 times axial length 26 of second longitudinal section 23, and an axial length 33 is also possible, which equates to 0.3 to 0.5 times axial length 26. For producing second indentions or recesses 35, 36, the wall on this axial length 33 is overall pressed-in in such a manner that the wall over axial length 33 has a maximum diameter 38 for second recesses 35, 36 which equates to 0.55 times of diameter 32 of smooth-walled outer tube 10, and a maximum diameter 38 is also possible which equates to 0.45 times to 0.65 times of diameter 32 of smooth-walled outer tube 10.

Figure 10:
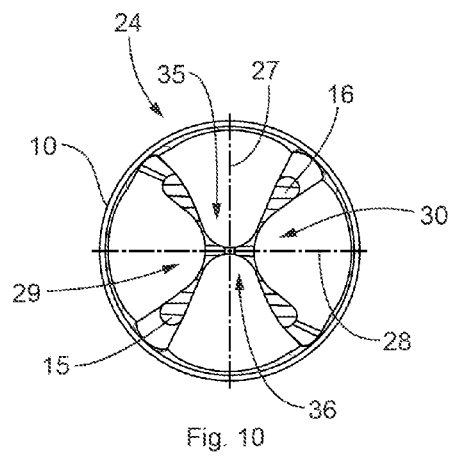
FIG. 10 shows a cross-sectional view of the heat exchanger tube according to the present invention for an axial position.
Figure 12:
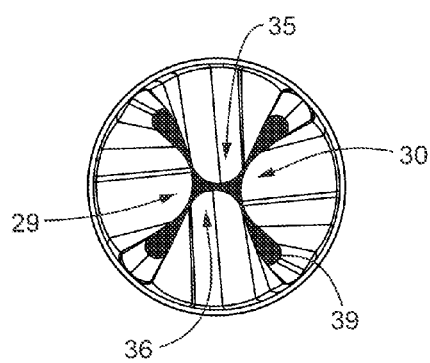
FIG. 12 shows a cross-sectional view for the heat exchanger tube corresponding with the position shown in FIG. 10, and the flow cross section is identified.
Figure 13:
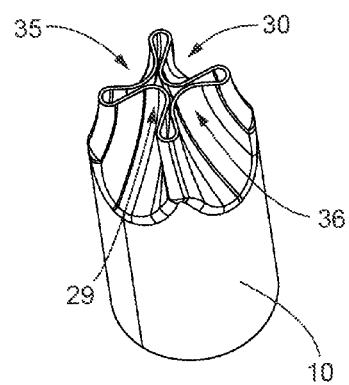
FIG. 13 shows a perspective illustration of the heat exchanger tube according to the present invention, and the area of the cross-sectional narrowing element is shown as a cross section.

The previous embodiment of first indentations 29, 30 and second indentations 35, 36 results in a flow cross section 39, which is shown in FIG. 10 on the basis of the hatched area referencing profiled insert 11 formed by shell elements 15, 16, and is shown in FIG. 12 on the basis of the area shaded in black. Since first and second indentations 29, 30, 35, 36 are formed at the same axial position of second longitudinal section 23 of outer tube 10, meaning that first and second indentations 29, 30, 35, 36 both extend over same axial length 33, flow cross section 39 of second longitudinal section 23 of outer tube 10, which is formed by first and second indentations 29, 30, 35, 36, has an H-shaped cross section. FIG. 13 shows outer tube 10 at which a tube section starting at the H-shaped cross section is omitted so that flow cross section 39 designed in the shape of an H is easily recognizable.

In heat exchanger tube 5 according to the present invention, cross-sectional narrowing element 24 of outer tube 10 illustrates a two-times symmetrically designed narrowing which prevents the disadvantages known from the related art. The difficulty for the heat exchanger tubes known from the related art is that the hot combustion gases flow through the heat exchanger tube from the inlet to its outlet and cool in this process. The accompanying and significant reduction of the combustion gas volume resulted in that the flow velocity and the turbulence are significantly reduced when reaching the outlet of the heat exchanger tube, which disadvantageously affects the efficiency of the heat transfer. The present invention improves the heat transfer because the flow velocity and the turbulence in heat exchanger tube 5 according to the present invention increase as a consequence of cross-sectional narrowing element 24. Indentations or recesses 29, 30, 35, 36 increase the pressure loss in the upstream located area before indentations or recesses 29, 30, 35, 36. In this manner, significantly more energy is able to be transferred in combustion chamber 4 and in the tubular section of heat exchanger tube 5 before indentations 29, 30, 35, 36. In the area of recesses 29, 30, 35, 36, the narrowing severely increases the flow velocity, by means of which the heat transfer and, for this reason, the energy usage are also increased. In the area after recesses 29, 30, 35, 36, thus downstream of the narrowing, the exhaust gas again expands and is guided into the section having profiled insert 11. Using the very large surface of ribs 14 of profiled insert 11, the exhaust gas here is cooled below the dew point and, therefore, promotes an advantage in the condensing boiler technology.

The substantial advantages of the present invention may be summarized as follows:

Increasing the pressure loss results in an improved heat transfer in combustion chamber 4 and at the inlet of heat exchanger tube 5.

Increasing the flow velocity in the area of narrowing 24 or recesses 29, 30, 35, 36, results in an improved heat transfer (laminar versus turbulent flow).

Increasing the heat transfer plane by means of ribs 14 of profiled insert 11 for the reduced flow velocity in first longitudinal section 22 of heat exchanger tube 5 after or downstream of narrowing 24 and the low exhaust gas temperatures result in an improved heat transfer.

Heat exchanger tubes 5 according to the present invention in a heating boiler 2 may transfer 85% to 90% more energy than technologies known so far.

The present invention previously described is, of course, not limited to the described and illustrated embodiments. It is evident that the embodiment illustrated in the drawing may be altered by a plurality of changes obvious to the skilled person with regard to the intended application without leaving the realm of the present invention. For example, cross-sectional narrowing element 24 may be formed as only one indentation 9 (instead of the four indentations) in the wall of second longitudinal section 23 of outer tube 10 or a plurality of cross sectional narrowing elements may be situated behind one another in axial direction 12 or at different axial tube positions. The present invention includes everything which is included and/or illustrated in the drawing, including those scenarios obvious to the skilled person but differing from the concrete exemplary embodiments.

The invention claimed is:

1. A heat exchanger tube of a heating boiler, comprising an outer tube, which may be flown through by exhaust gases from the boiler firing and which may be surrounded by boiler water on the outside, and a profiled insert inserted into the outer tube, which comprises ribs running in longitudinal direction of the outer tube to enlarge the inner surface of the outer tube and which is in thermally conductive contact with the outer tube,
wherein
a first longitudinal section of the outer tube is designed in a cylindrical, smooth-walled manner and a second longitudinal section of the outer tube has at least one cross-sectional narrowing element narrowing the flow cross section, wherein the profiled insert extends exclusively over the first longitudinal section of the outer tube,
wherein the at least one cross-sectional narrowing element comprises at least two first indentations which are formed in the wall of the second longitudinal section of the outer tube, wherein the two first indentations are situated diametrically opposite each other and are designed as a symmetrical mirror image in reference to a first tube plane,
wherein the cross-sectional narrowing element comprises in addition to the at least two first indentations at least two second indentations which are formed by the wall of the second longitudinal section of the outer tube, wherein the two second indentations are situated diametrically opposite each other and are designed as a symmetrical mirror image in reference to a second tube plane running perpendicular to the first tube plane, and
wherein the first and second indentations are formed at a same axial position of the second longitudinal section of the outer tube, wherein the flow cross section formed by the first and second indentations of the second longitudinal section of the outer tube has an H-shaped cross section.

2. The heat exchanger tube according to claim 1, wherein between the at least two first indentations at least a first flow gap is formed, which measures between 2% and 3% of the diameter of the outer tube.

3. The heat exchanger tube according to claim 1, wherein between the at least two second indentations at least one second flow gap is formed, which measures between 18% and 22% of the diameter of the outer tube.

4. The heat exchanger tube according to claim 1, wherein the axial length of the first longitudinal section equates to at least two times the axial length of the second longitudinal section.

5. The heat exchanger tube according to claim 1, wherein the profiled insert comprises a tubular body formed by at least two shell elements, which have respectively one cross section in the shape of a sector of a circle.

6. The heat exchanger tube according to claim 5, wherein the tubular body comprises two shell elements, which at their contacting longitudinal edges are formed having groove-shaped recesses and rib-like projections that engage in one another in a sealing manner, wherein the two shell elements are constructed on their interior side having the ribs, which project into a clear cross section of the tubular body and extend in the longitudinal direction of the outer tube, in such a manner that each shell element with its ribs constitutes a profile open on one side.

7. The heat exchanger tube according to claim 6, wherein the two shell elements are designed respectively having a sealing groove at one longitudinal edge and a sealing rib adapted to the shape of the sealing groove at the other longitudinal edge.

8. The heat exchanger tube according to claim 1, wherein the at least one cross-sectional narrowing element is designed as a tubular insert as a type of a duct which is slid into the outer tube in its second longitudinal section.

9. The heat exchanger tube according to claim 1, wherein the outer tube is made out of steel, and the profiled insert is made out of aluminum.

10. A heating boiler for heating boiler water of a heating circuit, comprising a housing which confines a boiler water space and which has a combustion chamber placed upstream of the boiler water space,
wherein
at least one heat exchanger tube according to claim 1, which branches off from the combustion chamber and extends running through the boiler water space, is situated within the housing.

11. The heating boiler according to claim 10, wherein the second longitudinal section of the outer tube having at least one cross-sectional narrowing element is situated between the combustion chamber and the first longitudinal section of the outer tube.

* * * * *